United States Patent
Larsen et al.

(10) Patent No.: US 10,293,589 B2
(45) Date of Patent: May 21, 2019

(54) SYSTEM AND METHOD FOR ADDITIVE FABRICATION USING LAMINATED SHEETS

(71) Applicant: The Boeing Company, Chicago, IL (US)

(72) Inventors: Ty A. Larsen, Everett, WA (US); Emma Romig, Seattle, WA (US); Bradley J. Mitchell, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 14 days.

(21) Appl. No.: 15/377,782

(22) Filed: Dec. 13, 2016

(65) Prior Publication Data
US 2017/0087816 A1 Mar. 30, 2017

Related U.S. Application Data

(62) Division of application No. 13/665,687, filed on Oct. 31, 2012, now Pat. No. 9,550,349.

(51) Int. Cl.
| | |
|---|---|
| B32B 41/00 | (2006.01) |
| B32B 38/00 | (2006.01) |
| B22F 7/08 | (2006.01) |
| B33Y 10/00 | (2015.01) |
| B32B 37/06 | (2006.01) |
| B32B 38/04 | (2006.01) |
| B29C 64/141 | (2017.01) |
| F28F 3/02 | (2006.01) |

(Continued)

(52) U.S. Cl.
CPC ............ *B32B 38/0004* (2013.01); *B22F 7/08* (2013.01); *B29C 64/141* (2017.08); *B32B 37/06* (2013.01); *B32B 38/04* (2013.01); *B33Y 10/00* (2014.12); *F28D 20/02* (2013.01); *F28F 1/10* (2013.01); *F28F 3/02* (2013.01); *F28F 2275/02* (2013.01); *Y02E 60/145* (2013.01)

(58) Field of Classification Search
CPC .............. B29C 67/0092; B29C 33/302; B29C 33/3842; B29C 67/0051; B29C 33/0088; B29C 33/3835
USPC ...... 700/98, 118, 163, 159; 156/59, 64, 249, 156/256, 257, 264, 267, 580
See application file for complete search history.

(56) References Cited

U.S. PATENT DOCUMENTS

| | | | |
|---|---|---|---|
| 4,752,352 A | 6/1988 | Feygin | |
| 5,301,863 A * | 4/1994 | Prinz | B22F 3/008 156/59 |

(Continued)

OTHER PUBLICATIONS

US Patent and Trademark Office; Office Action for U.S. Appl. No. 13/665,687 dated Jan. 30, 2015.

(Continued)

*Primary Examiner* — Michael N Orlando
*Assistant Examiner* — Joshel Rivera
(74) *Attorney, Agent, or Firm* — Parsons Behle & Latimer

(57) ABSTRACT

A method and system for fabricating a part includes sectionalizing a computer-generated representation of a part into strata having an order, forming layers corresponding to the strata from sheet material, stacking at least two of the layers in the order, and joining the layers together. The method and system are suitable for producing a phase-change material container for a thermal energy harvesting device, for example.

20 Claims, 13 Drawing Sheets

(51) Int. Cl.
F28D 20/02 (2006.01)
F28F 1/10 (2006.01)

(56) References Cited

U.S. PATENT DOCUMENTS

| | | |
|---|---|---|
| 5,637,175 A | 6/1997 | Feygin et al. |
| 5,745,834 A | 4/1998 | Bampton et al. |
| 6,682,688 B1 | 1/2004 | Higashi et al. |
| 8,079,509 B2 | 12/2011 | Lowney et al. |

OTHER PUBLICATIONS

US Patent and Trademark Office; Office Action for U.S. Appl. No. 13/665,687 dated Jun. 29, 2015.
US Patent and Trademark Office; Office Action for U.S. Appl. No. 13/665,687 dated Oct. 26, 2015.

* cited by examiner

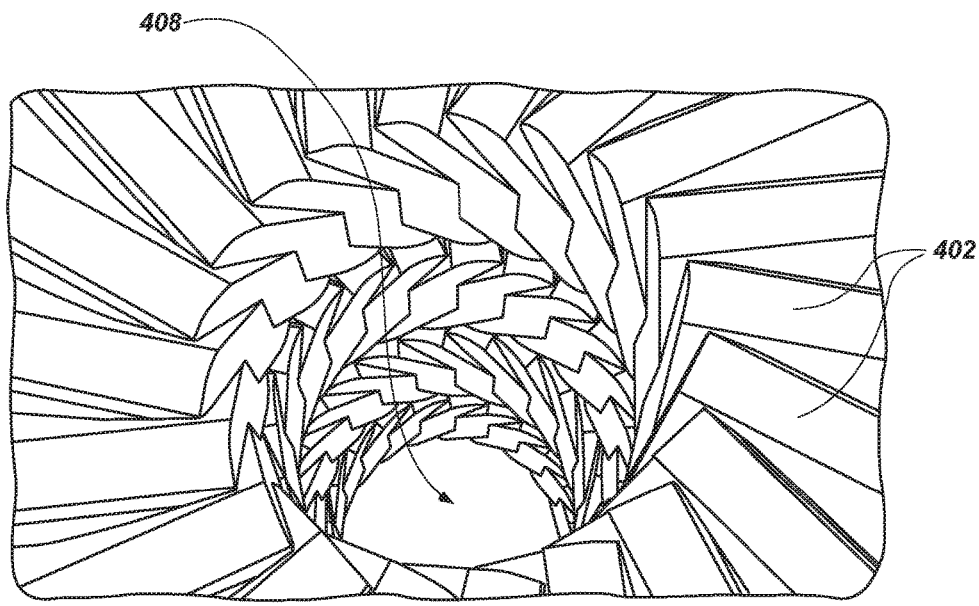
FIG. 5
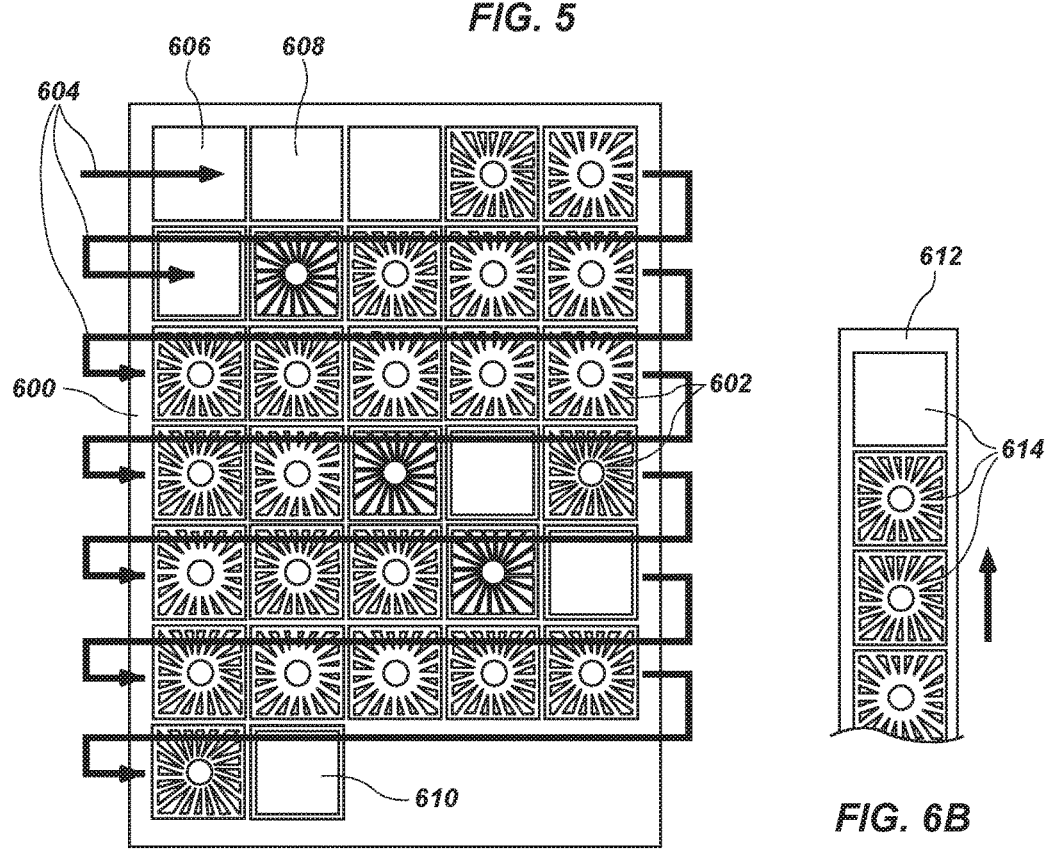
FIG. 6A
FIG. 6B

SYSTEM AND METHOD FOR ADDITIVE FABRICATION USING LAMINATED SHEETS

CROSS-REFERENCE TO RELATED APPLICATIONS

This application is a divisional of and claims priority to U.S. patent application Ser. No. 13/665,687, filed Oct. 31, 2012 and entitled "System and Method for Additive Fabrication Using Laminated Sheets," the contents of which are hereby incorporated by reference in their entirety.

BACKGROUND

Field of the Invention

The present invention relates generally to rapid prototyping techniques. More particularly, the present invention relates to a system and method for additive fabrication of parts using laminated sheets.

Related Art

Rapid prototyping is a growing field of interest and development in manufacturing today. Rapid prototyping is the blanket term for a variety of techniques for quickly fabricating scale models or even full scale prototypes of a physical part or assembly. Rapid prototyping can use additive or subtractive fabrication techniques. In one example of additive fabrication, three-dimensional CAD data is provided to a computer controlled device, such as a 3-D printer, which lays down successive layers of a curable medium, gradually producing a three-dimensional part.

Additive fabrication techniques enable the production of shapes and designs that are not possible using other more conventional tooling processes. Such designs can include enclosed spaces and other features that even highly complex machining equipment cannot easily produce. Although many existing additive fabrication techniques do not apply to metals, some additive fabrication techniques applicable to metals have been developed. These include laser sintering, electron beam melting, direct metal deposition, and ultrasonic consolidation, for example.

While these additive fabrication techniques are highly desirable for a range of prototype and production activities, current methods have some limitations. For example, known additive fabrication methods that can use metals tend to be very costly, require highly specialized equipment, and have limitations on materials that can be used. All of these issues make it difficult to use these techniques in some development activities. Limitations on materials can preclude the use of materials such as copper, which can be highly desirable in some applications. Some highly specialized processes, such as laser sintering, involve very specialized equipment and highly trained personnel, but may otherwise be the only option for fabricating some metal parts.

The present disclosure is directed toward addressing one or more of the above issues.

SUMMARY

It has been recognized that it would be advantageous to develop a method for rapid prototyping that can be used for fabricating metal parts from a variety of metals.

It has also been recognized that it would be advantageous to have a method for rapid prototyping that is relatively inexpensive and simple to employ.

It has also been recognized that it would be advantageous to have a method for rapid prototyping that can be used for production of completed parts.

In accordance with one embodiment thereof, the present invention provides a method for fabricating a part. The method includes sectionalizing a computer-generated representation of a part into virtual strata having an order, forming physical layers corresponding to the virtual strata from sheet material, stacking at least two of the layers in order, and joining the layers together.

In a more specific embodiment, the method includes providing a joining medium between each pair of layers. More specifically, the joining medium can be selected from the group consisting of soldering alloys, brazing alloys, alloys similar to the sheet material, metal powders and adhesives, or combinations thereof.

In another more specific embodiment, the method includes stabilizing the layers in a desired geometric alignment. This step can more particularly include inserting guide pins through guide holes in the layers for aligning the layers; and attaching the layers to an adhesive template disposed between layers.

In another specific embodiment, the step of forming the layers from sheet material can include laser cutting, water jet cutting, stamping, machining, and chemical etching. The step of forming the layers can include forming guide holes for the insertion of guide pins to stabilize the layers.

In another specific embodiment, the step of joining the layers comprises subjecting the layers to heat.

In accordance with another aspect thereof, the invention provides a system for fabricating a part. The system includes a forming device, configured to form individual layers of a sectionalized three-dimensional part from sheet material, a feeding device, configured to feed the sheet material to the forming device, and a joining device, configured to join the layers in a stack to produce the part.

In accordance with yet another aspect thereof, the invention provides a method of making a phase change medium container for a thermal energy harvesting device. The method includes generating a parametric model of the container using computer-aided-design (CAD) software tools, and sectionalizing the model into virtual planar strata having a stacking order, using the CAD software tools. The method further includes forming physical layers, conforming in contour and thickness to the corresponding virtual strata, from flat sheets of thermally conductive material, stacking the layers together in the stacking order, and joining the layers together to form the container.

BRIEF DESCRIPTION OF THE DRAWINGS

Additional features and advantages of the invention will be apparent from the detailed description which follows, taken in conjunction with the accompanying drawings, which together illustrate, by way of example, features of the invention, and wherein:

FIG. 5 is a top perspective close-up view of the fins of the container of FIG. 4;

FIG. 6A shows one exemplary layout of individual layers arranged on a wide sheet of material for forming the container of FIG. 4;

FIG. 6B shows another exemplary layout of individual layers arranged on a sheet that is approximately as wide as a single part layer;

DETAILED DESCRIPTION

Figure 1:
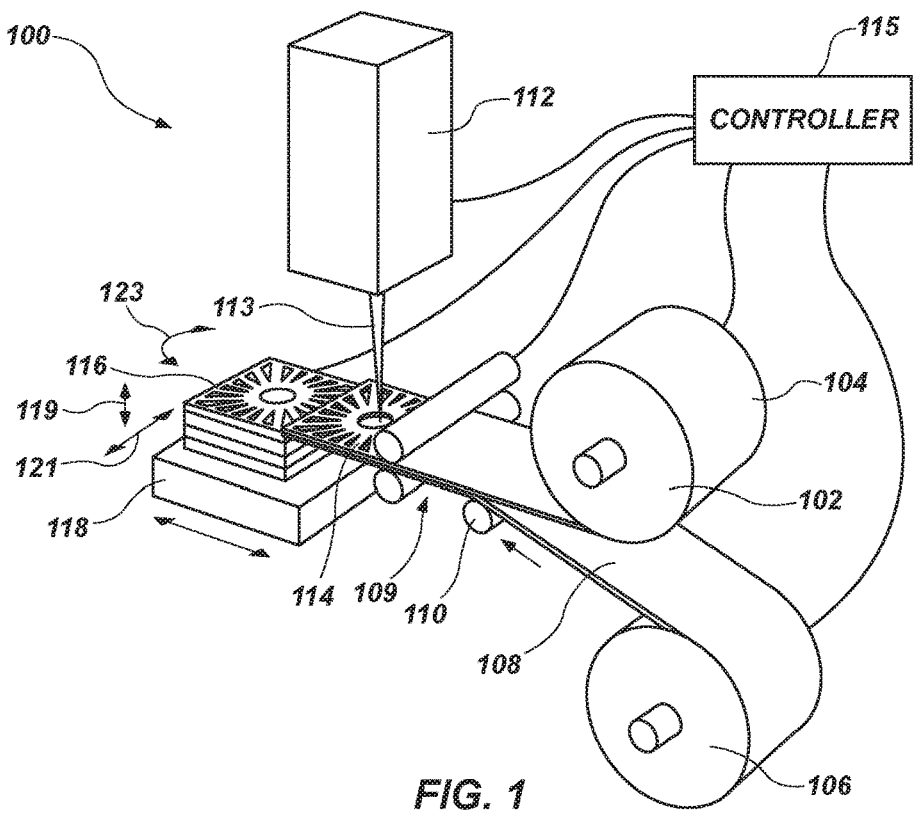
FIG. 1 is a perspective view of an embodiment of a system for additive fabrication using laminated sheets.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As disclosed herein, a system and method for additive fabrication of parts has been developed that uses laminated sheets. This method uses a laminate-type construction buildup technique, for the production of parts that are comparable to those that can be made by many other additive fabrication techniques, but is relatively simple, inexpensive and is adaptable to the use of a wider range of materials than can be used with some other techniques. Under one embodiment of the method disclosed herein, fabrication employs existing CNC techniques operating on sheet material, coupled with known welding and brazing techniques. This method offers benefits that are associated with purely additive fabrication, and the process can be implemented using existing, well-understood tooling (e.g. CNC or other metal-cutting equipment), instead of highly specialized hardware, and can be a lower cost alternative to "grown" parts. This method is also advantageous because it is readily applicable for use with metals. Metals are very desirable materials for the fabrication of a large variety of parts because of their strength and malleability. Also, metals are well suited to the method disclosed herein because they work well with overhang features and highly detailed or closely spaced features.

In general, a parametric model of a part is first sectionalized into virtual planar strata having a stacking order, using existing CAD tools. Physical layers, conforming in contour and thickness to the corresponding virtual strata, are then formed from sheet stock materials using one of many sheet processing technologies, such as laser cutting, etc. The layers are then stacked together in the stacking order, at which point they are attached together, such as by adhesive bonding, soldering, brazing, or welding, to make the finished product. In one exemplary embodiment, the method has been applied to the fabrication of a new type of thermal phase change energy-harvesting device.

FIG. 1 shows one embodiment of a system 100 for automated manufacturing via additive fabrication using laminated sheets in accordance with the present disclosure. The system includes a supply roll 102 of sheet material 104, such as metal or foil. This material is the material from which the part or assembly is to be constructed. Disposed below the supply roll 102 is a roll 106 of joining medium 108. This joining medium 108 can be an adhesive, a soldering alloy, a brazing alloy, or an adhesive/solder/binder material mix, for example. Other types of joining medium can also be used.

The sheet material 104 and joining medium 108 are drawn with each other from the respective rolls 102, 106, so that the joining medium 108 is applied to the bottom face of the metallic sheeting 104 as the sheeting material is unwound from the roll 102. This produces a two-layer composite web 109 that can be fed together, e.g. via feed rollers 110, to a cutting tool 112, which cuts the two-layer composite web 109, comprising the sheet material 104 and the joining medium 108 therebelow, into individual pieces 114 according to a desired pattern.

The cutting tool 112 can be a CNC laser cutting tool, for example which cuts using a laser beam 113. Other types of cutting devices can also be used. For example, the individual layers or pieces 114 can be cut or formed by methods including stamping, water jet cutting, chemical etching, machining, etc., as discussed in more detail below. Any method that is suitable for making precision cuts in sheet metals or other material of the selected thickness can be used. The cutting tool 112, feed rollers 110 and material rolls 102, 106 can be coupled to a computer controller 115, which includes a processor and system memory, and can be programmed with software for generating a parametric model of a three-dimensional part, and virtually sectionalizing the part into individual strata or layers of a selected thickness.

The shape of each discrete layer is then fed from the controller 115 to the cutting tool 112, which cuts the desired shape.

As each piece 114 is cut to the desired shape from the web 109, a final edge cut can be made to separate the piece 114 from the web 109, and the individual piece 114 is placed atop a stack 116 of previously cut individual pieces. The stacking step can be done in a variety of ways. Individual layers 114 can be stacked manually by a worker, or the layers can be stacked automatically, such as by a robotic tool. Such a tool could pick up parts magnetically, using vacuum, by mechanical clamping, or by any other suitable method.

Referring once again to FIG. 1, a movable base 118 can be configured to move in multiple axes with, e.g., four degrees of freedom (forward/back 117, up/down 119, left/right 121, and yaw 123), as shown by the respective arrows. The moveable base 118 can also be coupled to and controlled by the controller 115. The stack 116 can be placed upon the movable base 118, which can position the entire multilayer stack 116 below the web 109 as the web 109 of sheet material 104 and joining medium 108 for the next piece 114 to be cut is extended. The end of the web 109 that is cut to the shape of the piece 114 can then be placed upon the stack 116 prior to the final cut. Any number of other stacking operations can also be employed.

The joining medium 108 can be configured to have adhesive properties, which cause the joining medium 108 to attach to the sheet material 104, and cause the newly cut piece 114 to attach to the top of the stack 116. In an alternative embodiment, a two-part adhesive, such as a two-part epoxy, can be used to attach the joining medium 108 and the sheet material 104 together. In this embodiment, the two-part adhesive is mixed and applied to one or both mating surfaces (e.g. the sheet material 104 and adjacent joining medium 108). Alternatively, one part of the adhesive can be applied to a surface of one of the adjacent layers (e.g. the sheet material 104), while the other part of the adhesive is applied to the other layer (e.g. the adjacent joining medium 108). The adhesive then becomes activated as the two layers 104 and 108 are brought together, as they are being fed between rollers 110 and at the time of stacking after the cutting operation takes place. It will be apparent that in this embodiment all mating surfaces of sheet material 104 and joining medium 108 will receive complementary parts of the two-part adhesive in order to join the complete stack 116. Following placement of the newest piece 114 upon the stack 116, a new section of the web 109 of sheet material 104 can be extended to the cutting tool 112 and cut in a similar manner, but perhaps in a slightly different shape or pattern, as will be discussed later. When the entire stack 116 is completed, the resulting laminated form can be removed from the cutting tool and the layers, if not already joined or interconnected, can then be joined together, such as by heating in an oven or kiln, so as to thermally join the layers together, as discussed in further detail below.

Figure 2:
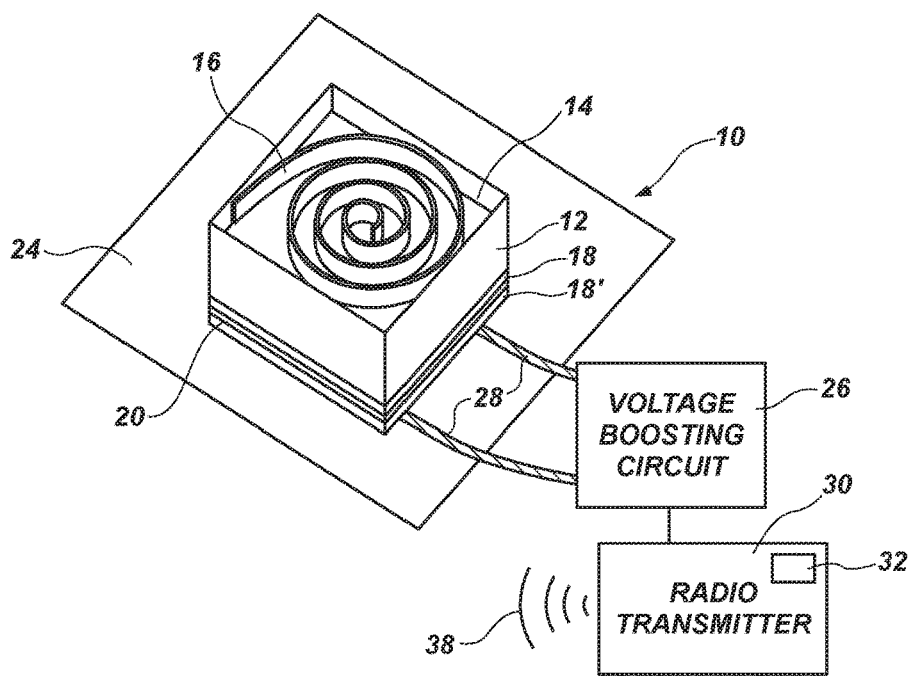
FIG. 2 is a perspective view of a thermoelectric generator having a phase-change material container that can be fabricated according to the system and method disclosed herein.

The method outlined above can be used for rapidly fabricating a wide variety of objects. One application of this method is for producing a phase-change material container for a thermoelectric generator. An example of a thermoelectric generator 10 is shown in FIG. 2. The thermoelectric generator 10 is adapted to generate electrical power from a thermal differential or gradient. To accomplish this, the thermoelectric generator 10 includes a thermoelectric device 20 that is adapted to produce electricity according to the thermoelectric effect when a thermal gradient is imposed across first and second major surfaces (not shown) of the device. The thermoelectric generator 10 can be attached to a thermally conductive substrate 24, which is exposed to temperature variations. One example of such a substrate is the skin of an aircraft, which experiences significant temperature changes during takeoff, flight, and landing.

The thermoelectric generator 10 also includes a first thermally conductive layer 18 between and in thermal contact with a phase-change material container 12 and a first major surface (not shown) of the thermoelectric device 20, and a second thermally conductive layer 18' between and in thermal contact with the substrate 24 and a second major surface (not shown) of the thermoelectric device 20. The phase-change material container 12 contains or encloses a phase-change material 14. One type of phase change-material that can be used is water. Other phase-change materials can also be used. This construction enables thermal communication between the phase-change material 14 and the thermoelectric device 20 such that electrical power can be generated. The thermoelectric generator 10 may be electrically coupled via electrical leads 28 to a voltage boosting device 26 and/or a radio transmitter 30 that is capable of transmitting signals 38.

The phase-change material container 12 can be constructed of a thermally-conductive material that is durable enough to withstand frequent changes in the volume of the phase-change material 14 as phase change occurs (i.e. transition between liquid and solid phases). It is also desirable that the container 12 restrict passage of the phase-change material 14 through the walls (so the phase change material will not dry out or be absorbed by the container 12 if the material of the container is hygroscopic), and resist leakage and corrosion. It is also desirable that the materials of the container 12 not degrade, chemically react with the phase change material or other substances in its environment, or structurally fail at anticipated temperatures. Suitable thermally-conductive materials for the container 12 include, but are not limited to, metal, metal-impregnated plastic, and thermally-conductive carbon. In one embodiment, the phase-change material container 12 can be copper or stainless steel. In another embodiment, the phase-change material container 12 can be or include a polypropylene or polyolefin polymer.

Within the phase-change material container 12, at least one fin 16 can be in thermal communication with the phase-change material 14. In general, the fin or fins can be oriented to allow heat to flow from the liquid medium 14 within the container to a wall of the container 12. The fin or fins 16 can be configured and positioned in various configurations within the phase-change material container 12 to provide a more uniform temperature throughout the phase-change material 14. A more uniform temperature of the phase-change material 14 provides higher voltages for better energy harvesting performance. For example, the buildup of the solid phase of the phase-change material 14 (e.g. water ice) inside the container 12 will be distributed over the combined surface area of the fin or fins 16 and the interior of the phase-change material container 12 and will therefore be substantially thinner than it would have been without the presence of the fin or fins 16. A thinner ice build-up over a larger area will support a higher temperature gradient, thus allowing higher power output.

The fins 16 may be made of or include the same or a different thermally conductive material as the phase-change material container 12. It is also generally desirable for the fin or fins to have the largest possible surface area and to extend as far as possible into the phase-change material 14 within the container 12. To this end, the fin or fins can be fabricated as a network of conductive material machined, etched, molded or otherwise formed into the desired shape by various techniques. The thermoelectric generator 10 can be very small, such as about 2.5 mm×3.3 mm×1.1 mm. Given the small size of the device and the desirability of providing thermal fins 16 having a large surface area within a closed container 12 that is made of thermally conductive material, fabrication of the container 12 presents several challenges. The fin or fins 16, shown in FIG. 2, are configured as a single generally spiraling coil of conductive material. However, other configurations can be used. In other embodiments, the exemplary fin or fins 16 can be a mesh material or microtrusses formed within the phase-change material container 12. In yet another embodiment, the fin or fins 16 can be a plurality of fingers of conductive material extending across at least a portion of the phase-change material container 12. Those of skill in the art will appreciate that other fin configurations are possible.

Figure 3:
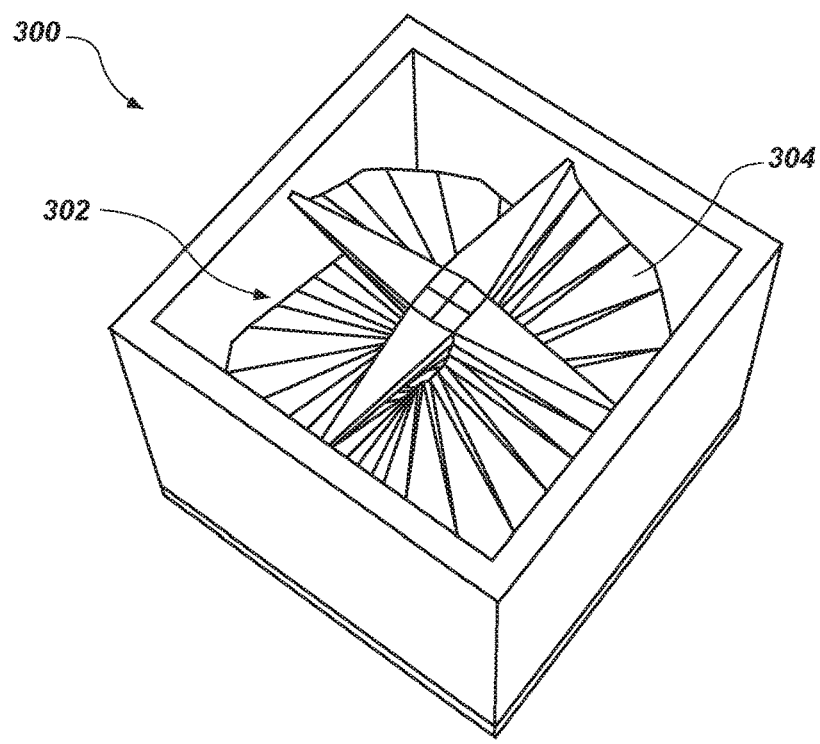
FIG. 3 is a perspective view of another embodiment of a phase-change material container for a thermoelectric generator that can be fabricated according to the system and method disclosed herein.

In other embodiments, the fins 16 can be configured as at least one spiraling coil of conductive material. Shown in FIG. 3 is a perspective view of an embodiment of a phase-change material container 300 for a thermoelectric generator having a spiraling coil 302 of multiple fins 304 of thermally conductive material radiating from the center of the container 300 toward its walls. Multiple coils 302 of this sort can also be provided in a single container 300, if desired. The container shown in FIG. 3 can also be used as a heat sink for electrical devices. While the external features of this part can be easily created using CNC equipment, the internal features would be far more difficult or impossible to produce using conventional machining methods.

Figure 4:
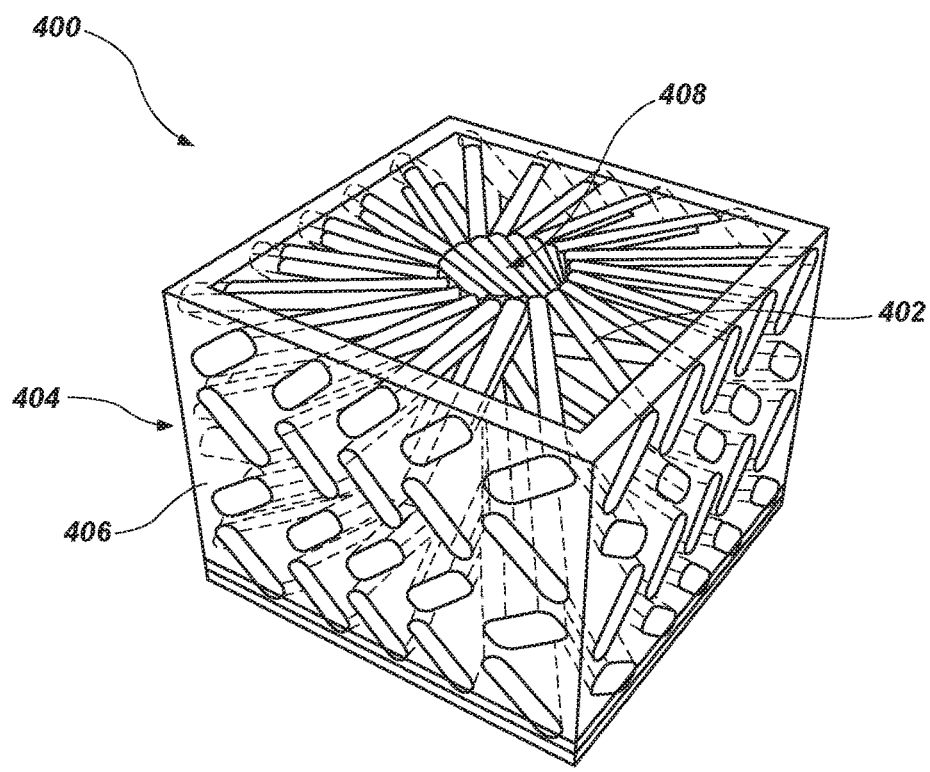
FIG. 4 is a perspective view of another embodiment of a phase-change material container that can be fabricated according to the system and method disclosed herein.

Shown in FIG. 4 is a perspective view of another embodiment of a phase-change material container 400, in which the fins 402 are a series of radial fins. The fins 402 are angled and arranged in a series of stacked fan-type layers 404 having alternating fin directions. Provided in FIG. 5 is a close-up top view of the fins 402 of the container of FIG. 4. In the view of FIG. 4 the outer wall 406 of the container 400 is shown transparent, so that the configuration and arrangement of the fins 402 can be seen. From these views it can be seen that the fins 402 are radially arranged to allow heat to flow from the liquid medium (e.g. water) to the casing or wall 406 of the container, so as to promote increased phase change heat transfer when enclosed in the liquid medium. Space is present throughout the device, including a central hollow 408, in order to allow for freezing/thawing of the phase-change material. This device can also be used as a heat sink for air or other fluids.

Figure 10:
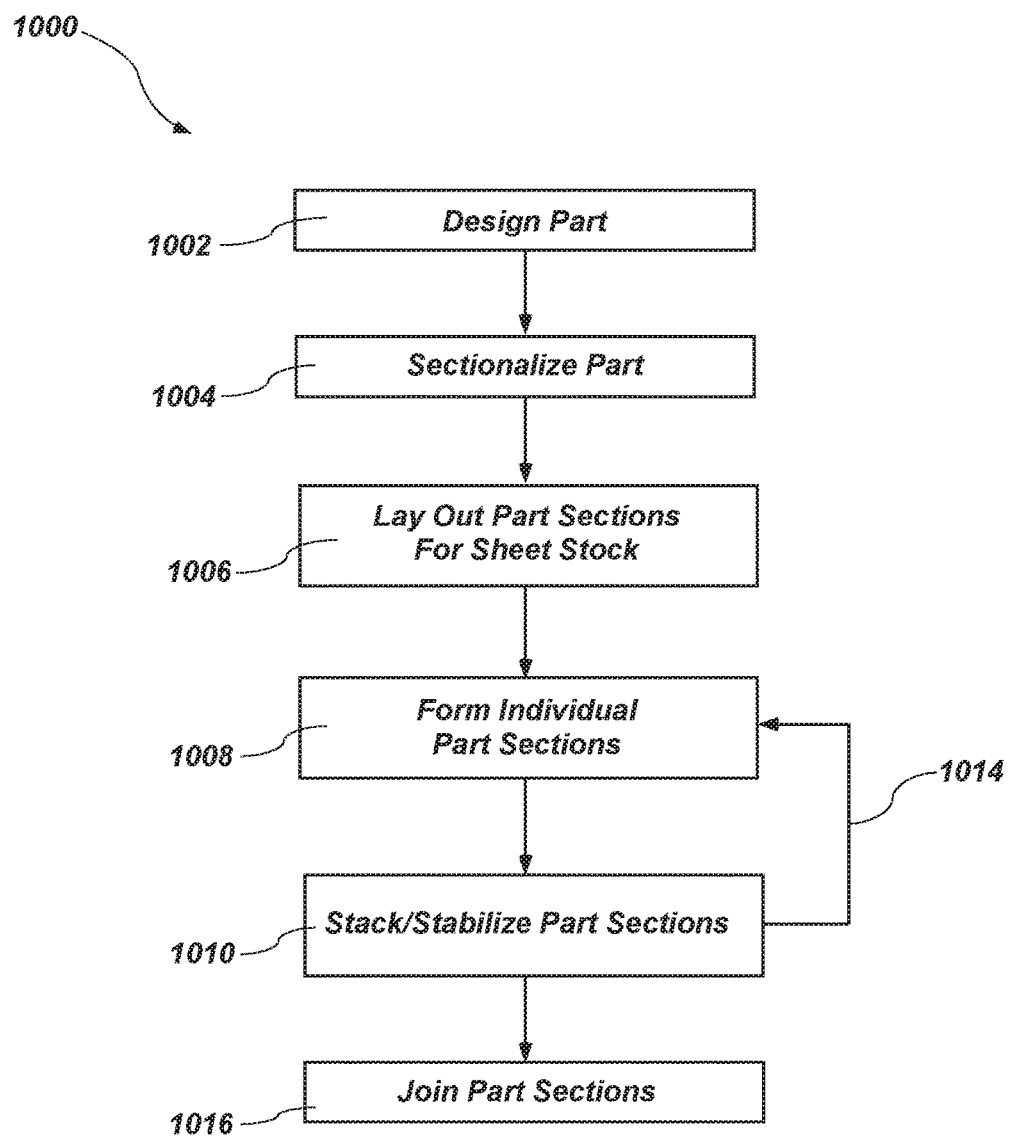
FIG. 10 is a flowchart showing the steps in one embodiment of a method for additive fabrication using laminated sheets.

Those of skill in the art will recognize that fabrication of the containers 300 and 400 of FIGS. 3 and 4 by conventional machining techniques would be very difficult. These parts have highly complex internal geometry, with many complex internal spaces. It is believed that constructing this design using conventional CAD/CAM processes would be extremely difficult, and perhaps impossible. However, these containers can be fabricated according to the system and method disclosed herein. The additive fabrication techniques disclosed herein allow this part to be "grown" from the base up by laminating sheets or foils together In order to produce a device like that shown in FIGS. 3-5, the method proceeds as outlined in the flowchart of FIG. 10. According to this method 1000, first the part is designed (block 1002) using computer aided design (CAD) tools, which allow the details of its geometry to be computationally determined by a computer processor. Next a parametric model of the part is computationally sectionalized (block 1004) into virtual planar strata or slices of a selected thickness. The slices can be of uniform thickness, or the part can be designed with slices of differing thickness, as discussed below. The sectionalizing process involves the computer system virtually slicing the part or device to determine the plan-view shape and geometry of each slice. The thickness of each slice can be selected based on the sheet thickness that will be used to reconstruct the design in physical form. Alternatively, the thickness of sheet material that will be used for all or any portion of the part can be selected based on the desired thickness of the slices. It is to be appreciated that thinner slices will provide higher resolution, which will tend to result in smoother surfaces in the finished article, measured in the direction perpendicular to the plane(s) of slicing. However, it will be apparent that thinner slices will also involve more cutting and more pieces to construct a given article.

Once the virtual sectionalization of the part is complete, the part sections are laid out for sheet stock (block 1006). This step essentially involves determining how to arrange the outlines of the part sections to be formed on a section of sheet-stock material from which the physical layers of the part, conforming to the corresponding virtual strata or slices of the parametric model, are to be cut. Shown in FIG. 6A is an example of how the individual sections or layers of the thermal phase-change energy harvesting device of, e.g., FIGS. 4-5 could be laid out in preparation for machine cutting. This view is of a section of sheet material 600 on which a series of outlines 602 of discrete part sections or layers are provided. These outlines can be generated by the computer system that controls the cutting tool (e.g., controller 115 in FIG. 1). It is to be understood that where a joining medium is to be used between adjacent part sections, the sheet material 600 can be underlain by such material, as discussed above, and the joining medium will be cut with the sheet material. Likewise, the sheet material 600 can be a section of a continuous web of material, as discussed above with respect to FIG. 1, or it can be a discrete section of sheet material, as shown in FIG. 6A.

In order to facilitate rapid cutting and stacking of the sections, the outlines 602 of discrete part sections or layers can be geometrically arranged on the sheet material 600 in exact sequential order so that each layer can be cut, then immediately stacked, as discussed above. The outlines 602 of the part sections in FIG. 6A are so arranged. Specifically, these outlines are arranged in the stacking order from left to right, top to bottom, as indicated by the arrows 604. That is, the part section 606 at the upper left is the first part section, the part section 608 to its right is the second, and so on, to the very last part section 610 at the bottom. Thus, a cutting tool can cut the part sections in this order and the sections can be immediately stacked.

Another arrangement, like that of FIG. 1, is shown in FIG. 6B. In this configuration, a plurality of part section outlines 614 are arranged as a single row or column on a sheet of material 612 that is approximately only as wide as a single part section. In this embodiment, each individual part section 614 can be cut and separated from the sheet material 612 in the stacking order. The sheet material 612 can be a continuous web extending from a roll of sheet material (like the roll 104 in FIG. 1), and each part section can be stacked prior to cutting of the next part section.

It is to be appreciated, however, that the outlines of the part sections can be arranged in some other order. For example, where part sections are somewhat irregular and/or the sheet material is costly, the outlines of the part sections can be arranged on the sheet in some geometric pattern that optimizes use of the sheet material and reduces waste. In such a situation, the order of cutting of the part sections may not exactly correspond to the order of stacking. Consequently, a staging position or some other arrangement can be used to set pieces aside until ready for stacking.

Figure 7A:
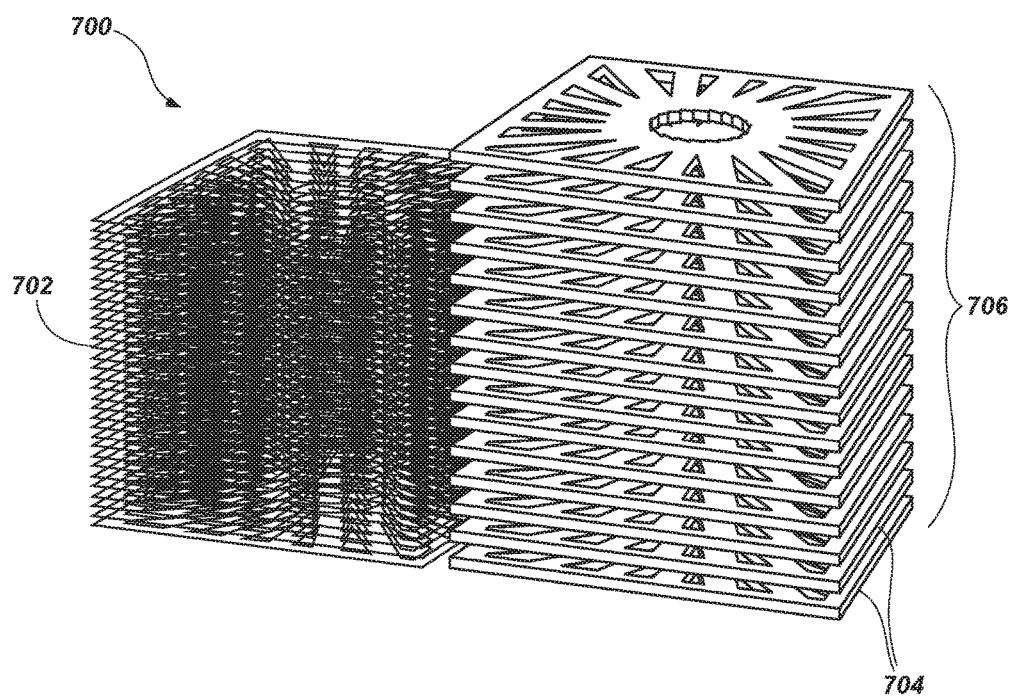
FIG. 7A is a perspective view of a computer-generated sectionalized model of the container of FIG. 4, shown next to an exploded view of a stack of cut layers representing approximately half the volume of the part.

Referring back to FIG. 10, after the outlines of the part sections are laid out, the part sections can then be formed (block 1008). After a given part section is formed (e.g., cut out), it is stacked (block 1010) in order with the other part sections, e.g., with the joining medium between adjacent part sections. As previously discussed, other means of joining the adjacent part sections may be used. By way of example, FIG. 7A illustrates a cube 700, representing the phase-change material container of, e.g., FIGS. 3-5, with the section lines 702 dividing the part into horizontal sections or layers. After these sections are cut, they are pulled from the machine and stacked. Approximately half of the part sections or layers 704 for the cube 700 are shown in an exploded view of a stack 706 in FIG. 7A.

When the individual sections are stacked, it is also desirable to stabilize the stack (block 1012), so that the individual part sections are properly oriented and aligned, and will remain so throughout the joining process. Stabilization of the design is also a consideration where there are "free floating" portions within a part section or layer. In other words, one or more portions of any one section or layer of the part may be physically disconnected from any other portion of that part section. The result of this condition is that the part can have free-floating portions in any particular section.

There are many possible ways in which the stacked part sections or layers can be stabilized. One approach to stabilizing the part sections is through the use of adhesive between layers, as discussed above. The adhesive can be part of or applied to the joining medium, or can be applied directly (e.g. sprayed or brushed on) to the surface of each part section, e.g. each part section 704, as the sections are cut or at any time before they are stacked. Advantageously, the joining medium or adhesive can serve two functions. Where a joining medium comprising an adhesive/solder/binder material mix is used, for example, the adhesive material as a whole can first serve to adhere and stabilize adjacent layers as they are initially stacked. This function is performed primarily by the polymer binder (e.g. epoxy) of the adhesive. Then, upon heating or other joining process, the binder portion of the adhesive can burn off, while the solder or brazing element (e.g. metal powder) that is held in the adhesive matrix then melts to permanently, fixedly bond the adjacent layers. The joining medium can thus be described as including a temporary bonding agent, and a permanent bonding agent. Two-part adhesives can also be used, as discussed above.

Figure 8A:
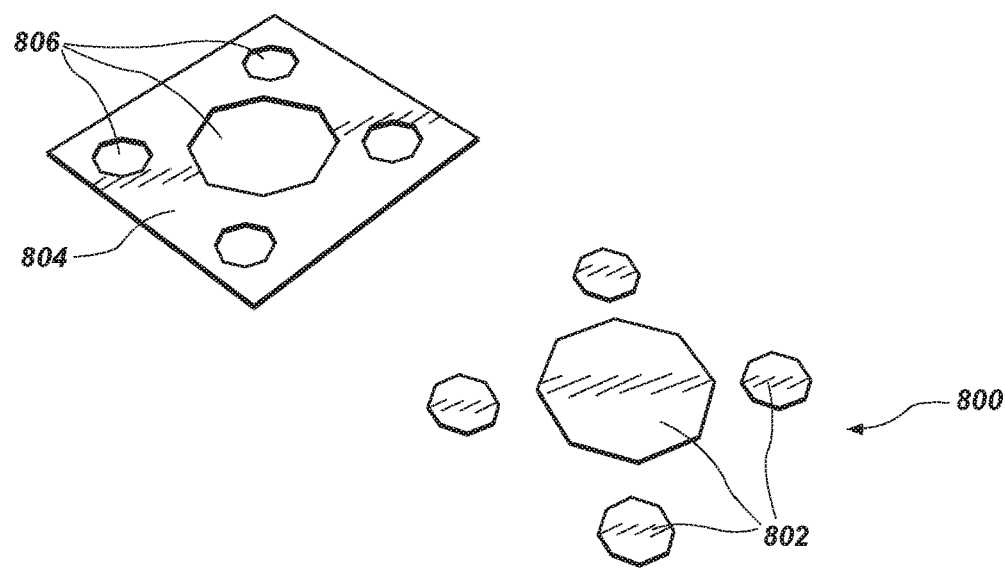
FIG. 8A is a perspective view of a part layer having floating portions, and a sacrificial template that has been specifically formed to stabilize the floating portions.
Figure 8B:
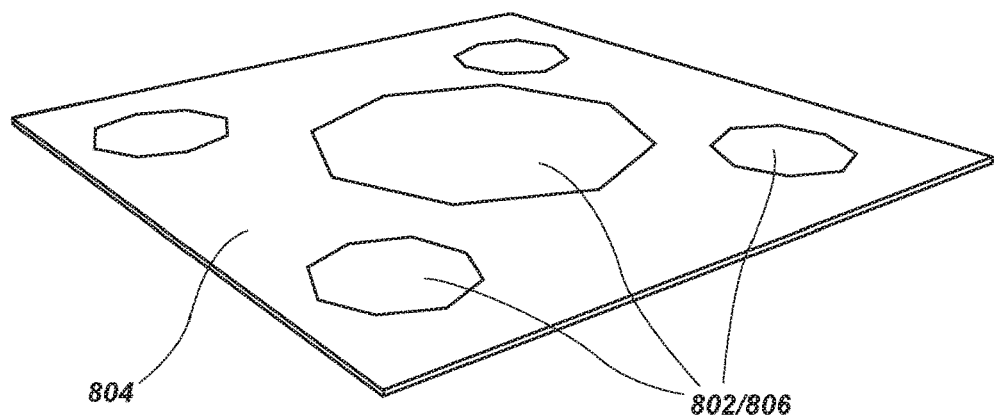
FIG. 8B is a perspective view of the part layer having floating portions of FIG. 8A, with its floating portions inserted into the sacrificial template of FIG. 8A.

It will be recognized that this approach alone will not stabilize the free-floating portions of the part sections. When free-floating portions are present, templates with pre-applied adhesive can be formed in patterns that differ slightly from the shapes of the contiguous part layers in that the templates include additional connecting features for supporting the free-floating portions of the part sections. The free-floating portion(s) can be attached to the template(s). In one embodiment, shown in FIGS. 8A and 8B, a part section, indicated generally at 800, includes multiple floating portions 802. A template 804 can be formed having a complementary shape, such as cutouts 806, providing a place to insert each floating portion 802. The part layer 800 with all of its floating portions 802 held in the cutouts 806 of the template 804 is shown in FIG. 8B. The template 804 maintains the position of the free-floating portions of the part section during assembly, and can be left in place, melted out, or burned off during or subsequent to the joining process.

The templates may be made, e.g., of plastic, wax, ABS plastic or other easy to burn-out material. Wax is frequently used in foundries for investment casting (sometimes called "lost wax" casting), and a wax or wax-type material can be used as a sacrificial template material. As another example, the template material can be water soluble—similar to what is frequently used in casting and composite layup designs. In general, the template material need only survive long enough to hold the parts in place until the part layer material has fused together, at which point the template can totally fail, and perhaps fall out of the part. Depending on the design, and assuming there is enough support when the part layers are stacked together, the stacked layers can be heated up to the melting point of the sacrificial template material, whereupon that material fails and falls out (or runs out) of the pattern. After the sacrificial material is completely removed, the part layers can sinter or otherwise bond or fuse together.

Figure 9A:
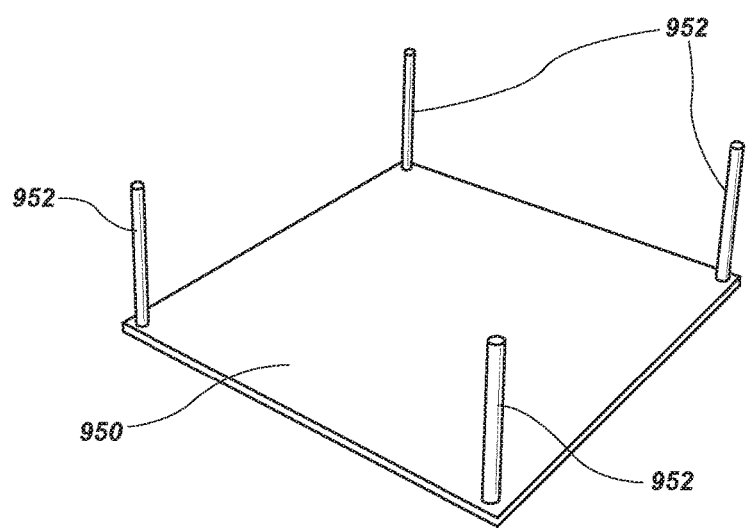
FIG. 9A is a perspective view of an embodiment of a base plate having guide pins for stacking part layers in accordance with the present disclosure.
Figure 9B:
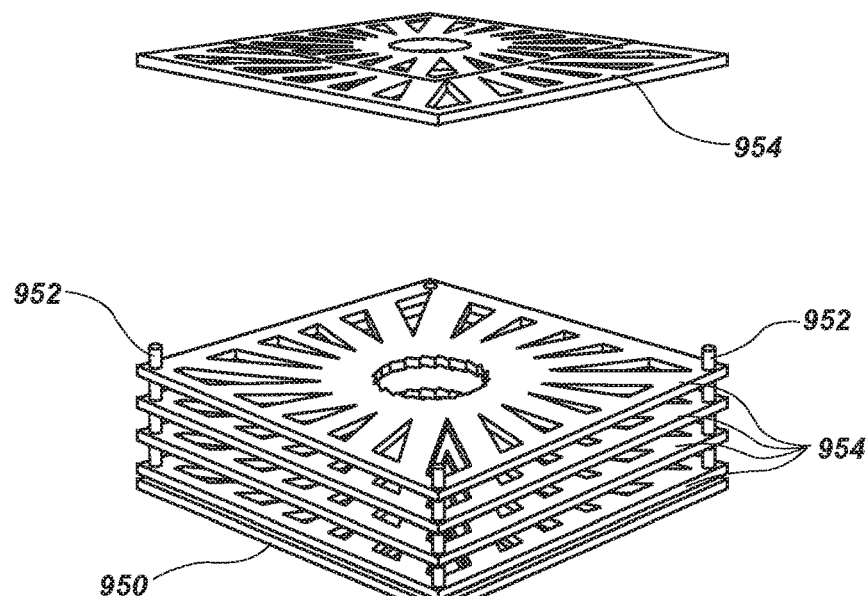
FIG. 9B is a perspective view of a series of layers in process of stacking upon the base plate and guide pins of FIG. 9A.
Figure 9C:
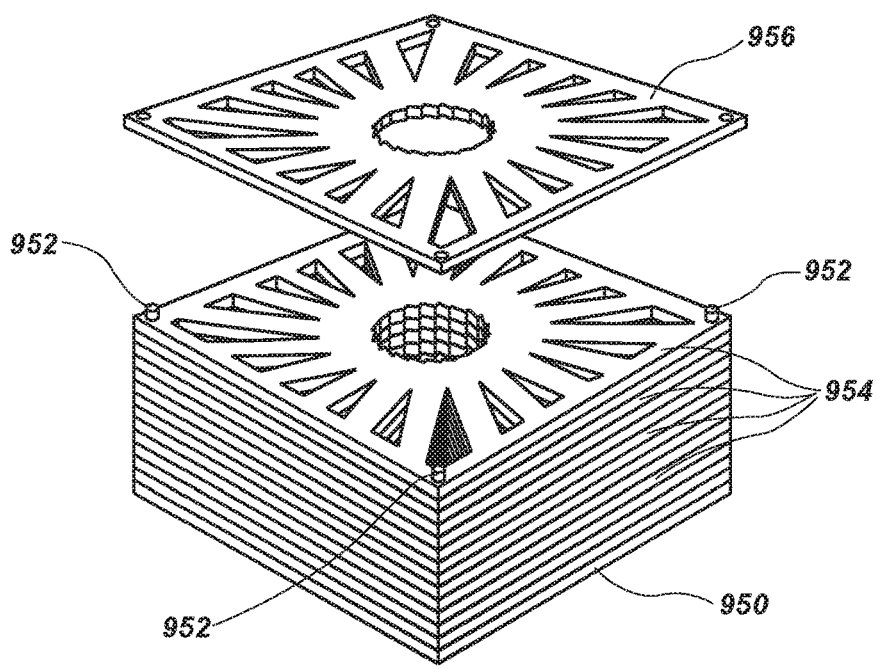
FIG. 9C is a perspective view of the part stack with all but the final layers stacked upon the base plate and guide pins of FIG. 9A.

Alternatively, part sections can be stabilized through the use of guide pins. An example of part sections being stabilized through the use of guide pins is shown in FIGS. 9A-9C. In this embodiment a base plate 950 is first provided with guide pins 952 for stacking the part layers 954. Each part layer 954 includes guide holes that geometrically align with the position of the guide pins 952. The layers 954 can be sequentially stacked atop each other upon the guide pins 952 until the final layer 956 is stacked, as shown in FIG. 9C.

Figure 9D:
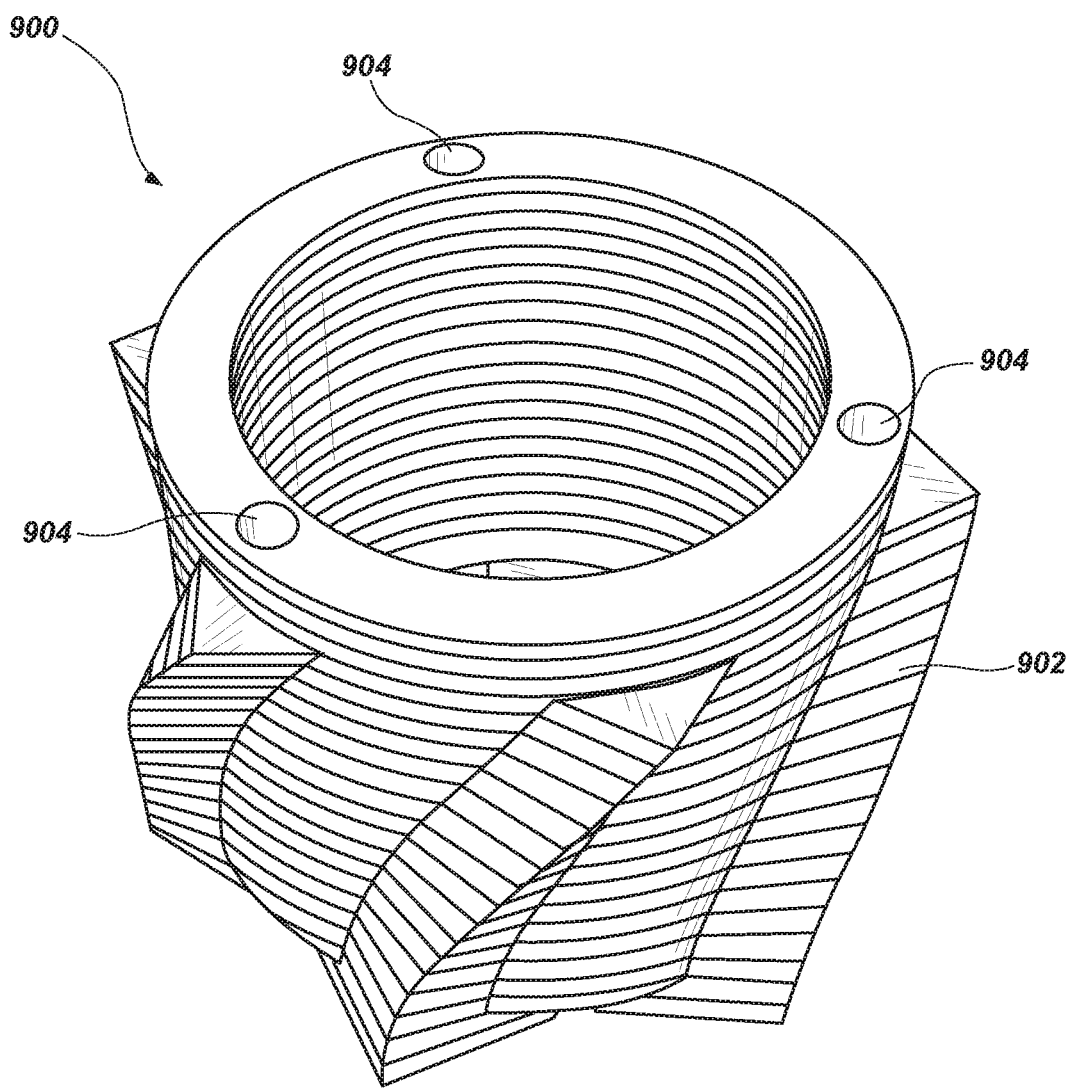
FIG. 9D is a top perspective view of another exemplary part that can be fabricated according to the system and method disclosed herein, showing the sectional lines and guide holes.

FIG. 9D shows another example of a part 900 that can be stabilized with guide pins. The part 900 is divided into a series of stacked part sections 902, denoted by horizontal lines. In this view it can be seen that the part has a series of guide holes 904, formed in each part section 902 to allow the individual part sections to be mounted on guide pins (in the manner shown in FIGS. 9A-9C). The stack of unjoined part sections 902 may not stay together or in alignment without guide pins because of the geometry of the sections. Additionally, some particular part designs may not be a good candidate for adhesive or other attachment of successive layers. By incorporating guide holes 904 into the design, and using guide pins for mounting the part sections during stacking, the section orientations can be maintained properly for the joining process.

In one embodiment, the guide pins can be made of a material that is similar to the sheet material and can be left in place after assembly. Alternatively, the guide pins can be removable or can be burned out of the part at the end of assembly. Guide pins that can be burned out or melted out of the part may be made, e.g., of ABS plastic. Other materials can also be used.

Figure 8C:
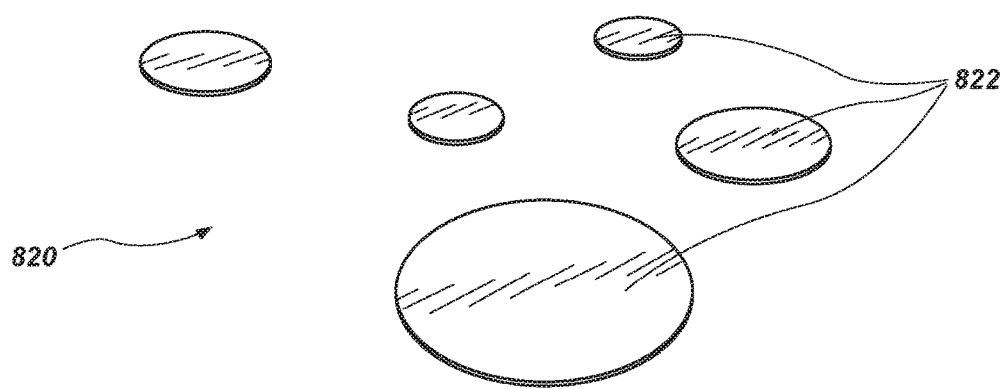
FIG. 8C is a perspective view of a part layer comprising floating portions.
Figure 8D:
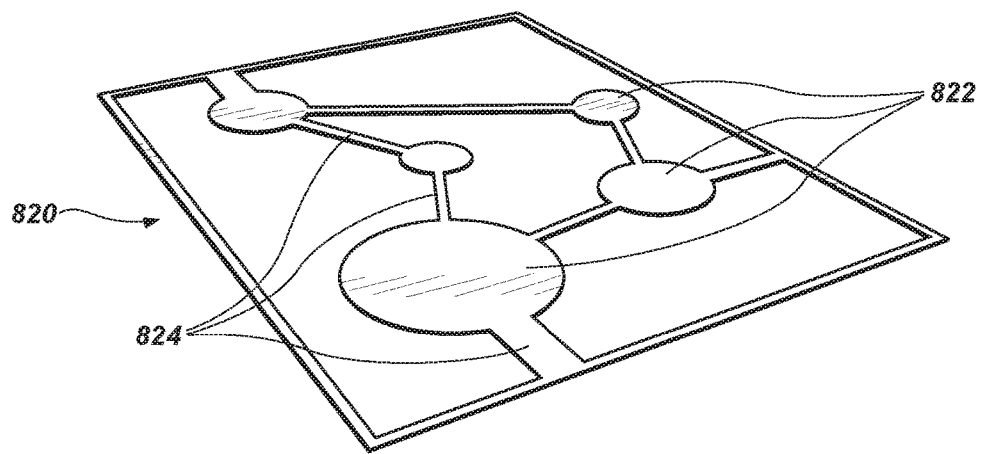
FIG. 8D is a perspective view of the part layer of FIG. 8C, with the otherwise floating portions interconnected for stabilization.

Other approaches to manufacturing a part with sections having free-floating portions can also be used. For example, the design of a part can be selected or modified to provide physical attachment points to reduce or eliminate floating portions of the part sections. For example, extensions of the sheet material can be incorporated into the design to attach what would otherwise be a free-floating portion to a given part section. Such a configuration is shown in FIGS. 8C and 8D. In this embodiment, a part layer, indicated generally at 820, includes floating portions 822. In order to facilitate fabrication and stacking of this part section 820, the part layer can be designed with the otherwise floating portions 822 interconnected by attachments 824 for stabilization, similar to the manner in which injection-molded parts are interconnected by sprues that are a byproduct of an injection molding process. This approach holds the part layer features together in the desired pattern. Randomizing the location and arrangement of the attachments 824 between floating portions 822 can allow an interior section to be kept open, such as to allow fluid to flow through the final product. Alternatively, the extensions or attachments 824 can be machined away or otherwise removed by some additional process step after the part is finished or at some intermediate time during part fabrication. Indeed, it is to be understood that a part that is made by the method disclosed herein can be fabricated in multiple parts or subassemblies, which can have independent machining or other processes performed on them, and then joined together. Thus, multiple stacking and joining steps can be involved in the process, and a given joining step can join individual layers or can join a subassembly of previously joined sheets.

Figure 8E:
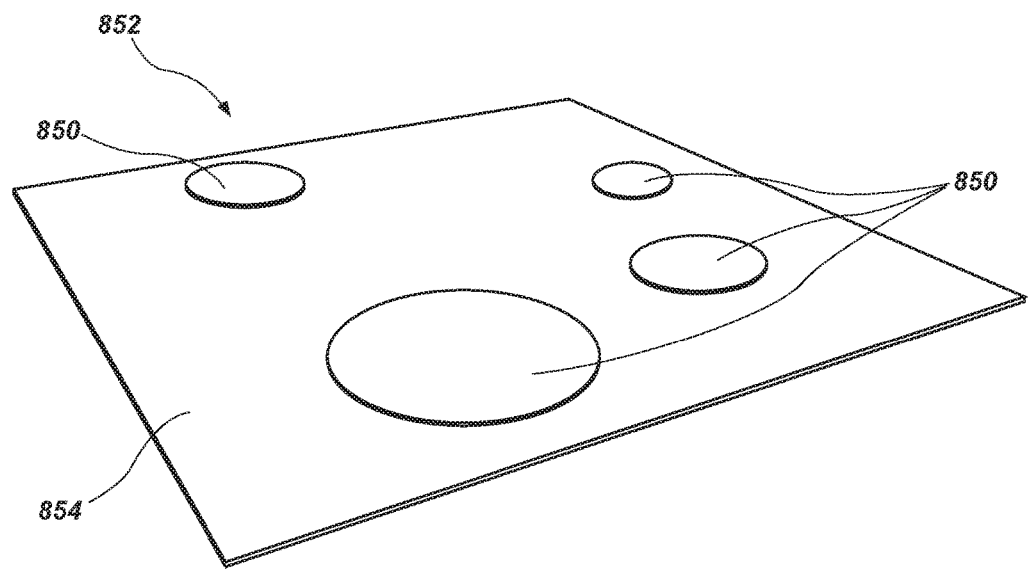
FIG. 8E is a perspective view of floating portions of a part layer held in place by an adhesives layer.

In another example, a truss-like or porous internal structure can have a large number of free-floating small elements in each layer, with little or no suitable structure to hold them in position for assembly. In this case, solid-sheet adhesive layers can be used to produce a part having individual layers with many floating elements. An illustration of this approach is shown in FIG. 8E, in which a number of floating portions 850 of a part layer, indicated generally at 852, are held in place by a solid sheet adhesive layer 854. The adhesive layer can be left in place, melted out, or burned off during or subsequent to the joining process, in various ways as discussed above. Alternatively, each sheet of adhesive can have continuous or nearly continuously connected surface areas that allow the design to be held together after cutting.

Referring again to FIG. 10, as the individual part sections are formed and stacked, the steps of forming (block 1008), stacking (block 1010), and stabilizing (block 1012) can be performed repeatedly, as indicated by an arrow 1014. For example, when the part sections are laid out and cut in sequential order, the process can include a plurality of repeating cutting, and stacking/stabilizing sequences. Alternatively, where many parts are cut and then later stacked, the process can include a plurality of consecutive cutting steps followed by a stacking/stabilizing step. Other sequences can also be used.

Figure 7B:
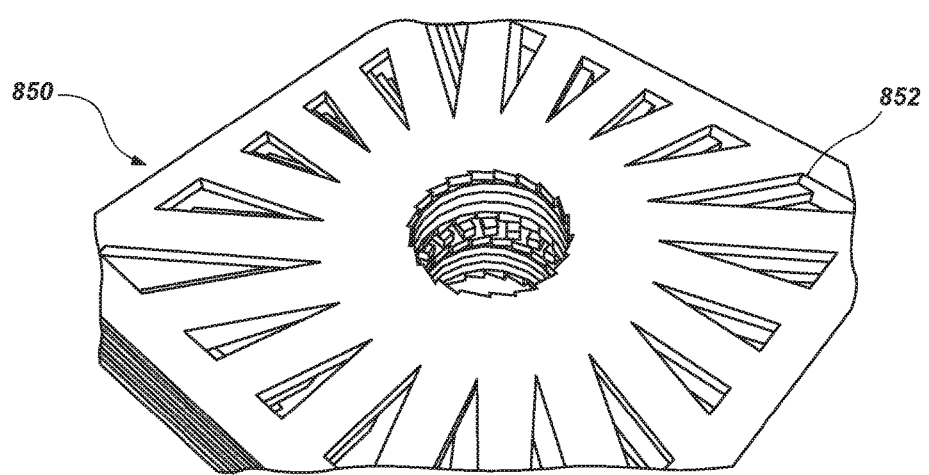
FIG. 7B is a top perspective view of an interim layer of the container of FIG. 3.

FIG. 7B is a top view of one of a plurality of interim layers 850 of the phase-change material container of FIGS. 4-5. Since all edges 852 of each layer 850 are formed in a direction parallel to the stacking direction of the layers 850, surfaces, defined by such edges, that are sloped or curved in the direction generally parallel to the stacking direction of the layers 850, will not be perfectly smooth. How closely the final part matches its parametric model depends on the thickness of the sheet material. The example shown in FIG. 7B is representative of sheet material having a thickness of about 0.10 inches (about 2.54 mm). Thinner sheet may be used to more closely mimic the parametric model of the part. Alternatively, thicker sheet can be used for various reasons, such as to reduce cost or time of fabrication, or to minimize the number of joining layers. Additionally, sheets of differing thicknesses can be used in a given part. The reasons for this can vary. For example, less intricate portions of a part may be constructed from thicker sheet and more intricate portions from thinner sheet. In other words, where some portions of a part have little or no geometric variation over a range of layers of the sectionalized parametric model of the part (measured in a direction perpendicular to the plane(s) of slicing), it may be desirable in that portion of the part to incorporate a layer or layers of greater thickness, rather than taking the extra steps of cutting and bonding several layers of substantially identical geometry to produce substantially the same result.

It is believed that the method disclosed herein can be used with very thin foil-type materials having a thickness of from about 0.003 to about 0.005 inches (about 0.076 mm to about 0.127 mm), up to heavy plate material having a thickness of about 1 inch (about 25 mm) or more, as well as with intermediate-thickness materials. It is to be understood that the term "sheet" as used herein is intended to encompass everything from very thin foil-type material to heavy plate material, whether metal or some other material. Where the sheet material is very thin, it will be apparent that specialized handling techniques and machines may be desirable for handling and stacking the layers.

The features of the final part can be very close to the proposed design when sheet material of appropriate thickness is utilized. For the phase-change material container disclosed herein in one or more aspects thereof, it is believed that copper sheet of about 0.01 inches (0.254 mm) produces a finished part that is close enough for prototype and testing purposes, and may even be suitable for production usage.

As noted above, many different systems and methods can be used for forming and stacking the part sections. The system illustrated in FIG. 1 shows a CNC laser cutting tool 112, which cuts using a laser beam 113. Alternatively, a cutting and stacking system laid out substantially like the system 100 can use a water jet cutting device or other cutting device in place of the laser cutting tool 112.

Figure 11A:
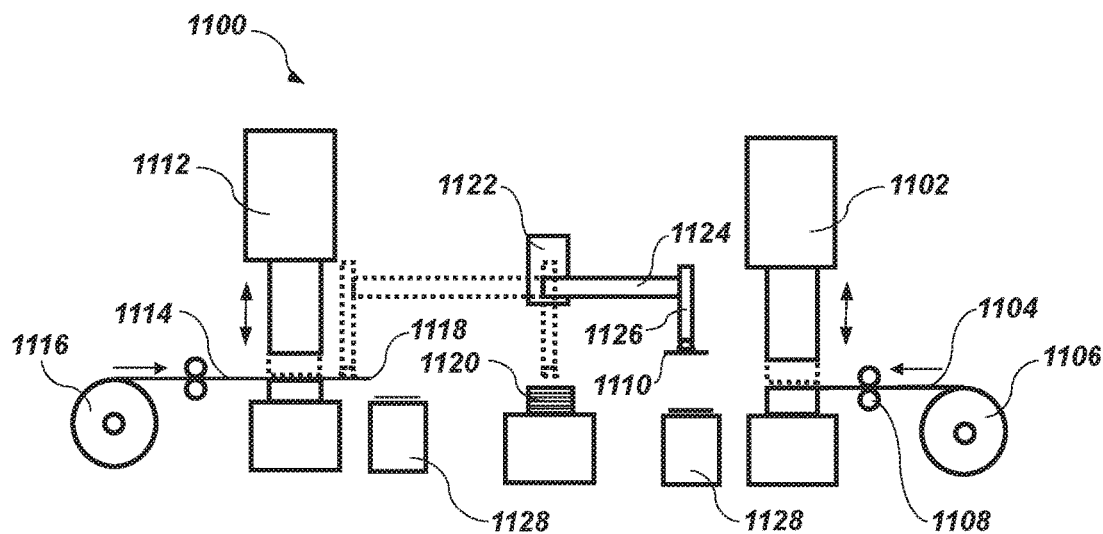
FIG. 11A is a diagram of another embodiment of a system for additive fabrication using laminated sheets that are formed by stamping.
Figure 11B:
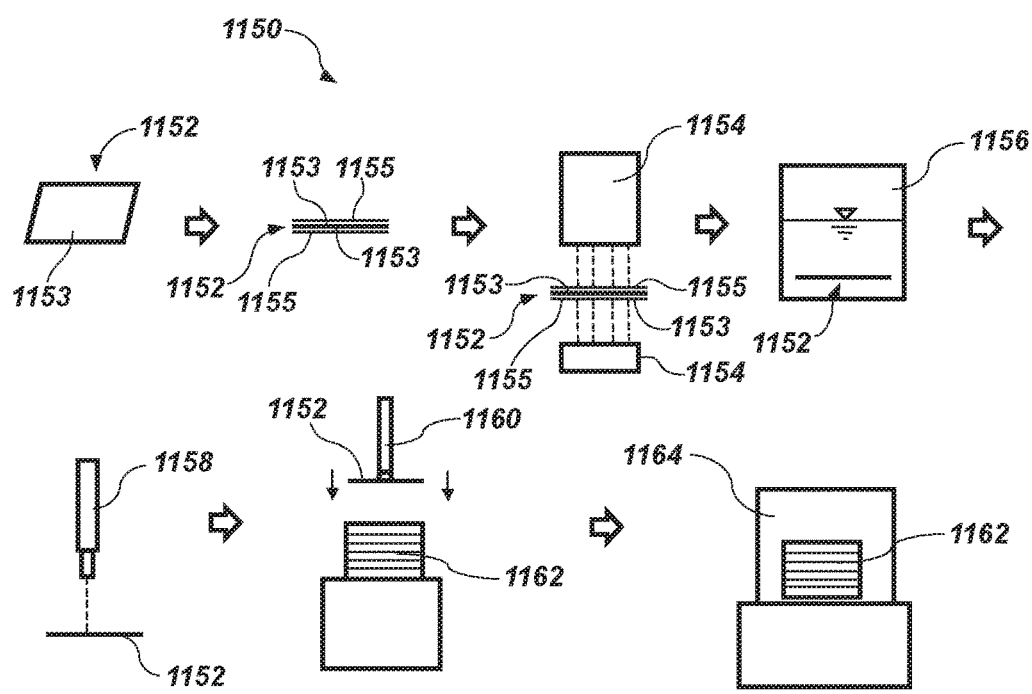
FIG. 11B is a diagram of another embodiment of a system for additive fabrication using laminated sheets that are formed by chemical etching.

Two other alternative forming and stacking systems are shown in FIGS. 11A and 11B. One forming and stacking system 1100, shown in FIG. 11A, includes a first stamping press 1102, which receives sheet material 1104 from a roll 1106 of the bulk material. Feeding rollers 1108 feed the sheet material to the press, which can form the individual part sections or layers 1110 from the sheet material in a single operation. To facilitate fabrication of the different shapes of each layer, the press 1102 can be provided with multiple punches and dies (not shown), which can be rapidly interchanged.

A second stamping press 1112 can be provided, which receives adhesive and/or bonding medium 1114 from a bulk roll 1116 of that material. Like the first press 1102, the second press 1112 can form individual templates 1118 from the adhesive and/or bonding medium in a single operation. Like the first press 1102, the second press 1112 can be provided with multiple punches and dies, which can be rapidly interchanged for cutting templates of different shapes.

After forming, the individual part sections or layers 1110 of sheet material and the templates 1118 of adhesive and/or bonding medium can be placed in a stack 1120 by an automated stacking machine 1122, which can include a robotic arm 1124 configured to pick up the individual part sections 1110 and the templates 1118 of bonding medium (e.g. via a magnetic, vacuum, or other picking head 1126) and place them in order and in proper geometric alignment in the stack 1120, prior to joining, such as by heating in an oven (1164 in FIG. 11B). The system 1100 can also include one or more intermediate storage locations 1128 for the part sections 1110 and/or the templates 1118 to accommodate a process that forms the part sections and/or the templates in an order that differs from the stacking order. It is to be understood that the elements of the figures and embodiments shown herein can be arranged in a different order, and/or combined with elements of other embodiments disclosed herein. For example, more than two sheet cutting or stamping tools 1102, 1112 can be associated with a single automated stacking system 1122. As another example, a laser cutting device, like the cutting device 112 shown in FIG. 1, can be used in the embodiment of FIG. 11A, rather than the stamping presses 1102 and 1112. Similarly, the automated stacking machine 1122 and robotic arm 1124 can be used in other embodiments shown and described herein. Other combinations can also be used.

Another forming and stacking system, e.g., a photochemical etching system 1150 is shown in FIG. 11B. Photochemical etching can be desirable for producing very fine detail in each layer. It is to be appreciated that the system shown in FIG. 11B is exemplary in nature and represents only one possible system for producing part layers in accordance with an aspect of the present invention. In this system, a portion of sheet material 1152 is laminated on both sides with a photo-sensitive chemical layer (photoresist) 1153. The shape of the part to be formed is transferred onto two sheets of photographic film 1155, wherein the areas of the part to be etched away are black and the remaining areas are clear. The laminated portion of the sheet material 1152 is then positioned between the two sheets of photographic film 1155 and exposed to electromagnetic radiation, e.g., UV radiation, in an exposure device 1154, allowing the photoresist associated with the clear areas of the photographic film to harden. After exposure, the unhardened photoresist associated with the black areas of the photographic film is removed, leaving the areas to be etched unprotected. The sheet 1152 is then placed in a chemical bath 1156, where those portions of the sheet where the photoresist 1153 has been removed are etched away by the chemicals, while those parts of the sheet on which the photoresist 1153 remains will be protected from the chemicals.

The sheet 1152 can be sized for producing a single layer of the stacked part, or it can be sized to produce multiple layers. Where multiple layers are to be produced from a single sheet, the sheet can be removed from the chemical bath 1156 following rinsing, etc. (as is well known in chemical etching processes) and can then be separated into individual pieces using a cutting tool 1158 (e.g. a laser cutting tool, water jet cutting tool, dicing saw, etc.), and the individual pieces can be picked up by an automated stacking tool 1160 and placed in a desired order in a stack 1162, as discussed above. Alternatively, the cutting pattern for separating the individual layers can be incorporated into the photographic film sheets 1155, so that the chemical etching process itself separates the individual pieces. It will be apparent that the sheet 1152 material can be physically stabilized in various ways before putting it into the chemical bath, so that the multiple pieces can be produced and separated, then picked and stacked by the stacking tool 1160, before the stack 1162 is placed in an oven 1164, for example. It is to be understood that the systems shown in FIGS. 11A and 11B are just two examples of systems that can be used for cutting, stacking and joining of layers for making a part in accordance with the present disclosure.

Referring again to FIG. 10, once all of the sections are stacked (block 1010) and stabilized (block 1012), with the joining medium between them, the sections can be joined together (block 1016). Joining can be accomplished in many ways, depending on the type of sheet material, the type of joining medium, and other factors. Various thermal joining methods can be used. For example, the stack of laminated layers can be placed into an oven or kiln and heated to a temperature that will melt the joining medium without melting the sheet material, and cause the metal layers to be brazed or soldered together. Joining can be accomplished using a joining medium that is a mix of solder, powder, and resin, similar to the type of joining medium that is frequently used in surface mounting of electronic components. As another alternative, the sheet material and joining medium can be different alloys of a common base metal, the joining medium having a slightly lower melting point so that upon heating to a temperature below the melting point of the sheet material, the joining medium melts or at least sinters to bind the layers together, thus producing a part of a substantially similar material. In addition to an oven or kiln, other heating methods and systems can also be used, such as a heating torch, heating plate, induction heater, etc.

Other thermal and non-thermal joining methods can also be used. Electric arc welding or friction welding techniques can be used to join the layers together, for example. In another embodiment, the sheets can be joined using a diffusion welding technique. In this approach, no joining medium is provided between the sheets, and the stack of sheets is heated to a temperature below the melting temperature of the metal while a compressive force is applied to the stack.

In another thermal method, metal powder or dust in a binding medium can be applied between the layers. For example, polyamide-coated copper particles, or copper that is mixed or suspended within liquid solder fluxes or solder pastes can be used. When the part is heated, the metal powder can melt or sinter and thereby join the layers together. Examples of existing sintering materials include polyamide-coated copper as used by DTM/3D Systems Corporation of Rock Hill, S.C., as well as liquid- and paste-based fluxes such as those produced by Force Industries Division (AMCO line) of Paoli, Pa. Materials such as polymers can also be chosen to help maintain structure, and can later be "burned off" or otherwise removed when the metal component is heated. Liquid fluxes and pastes can also provide a dual function of both holding particles in place, while also assisting in the sintering process when exposed to heat.

As another alternative, the edges and surfaces of the sheets can be porous providing a slightly higher electrical resistance at these points, and a brazing or soldering material can be drawn between the sheets by capillary action or "wicking" when they are electrically heated. Porous metal items can be created by any one of various sintering-style methods, which are well known in the art. For example, copper is frequently used in a sintered porous filter design. Prior to stamping or otherwise cutting or forming the layers, sheets having a porous surface can be produced by a process in which sheets are first coated with a powder, then heated (e.g. to a sintering temperature), and perhaps also treated with gas injection during the heating process. Porous sheet surfaces can also be produced through various chemical-etching processes. Heat-activated adhesives between the layers can also be used, as well as other thermal methods.

As noted above, the method disclosed herein also applies to non-metal materials, such as polymers, ceramics, etc. Thus, any suitable method for joining non-metals can also be used, where applicable, and these can include thermal or non-thermal methods. For example, thermal and non-thermal methods for joining polymers or other materials can be used, such as thermal welding, adhesives, solvent welding, etc. Adhesives can also be used to permanently join metal or non-metal layers together, and these can include heat-activated adhesives, low-temperature adhesives, and one- or two-part adhesives. As another and more basic alternative, in some cases the layers of the part can simply be bolted together or otherwise mechanically fastened into the complete part.

The fabrication method disclosed herein can be adaptable for many types of parts. While some types of parts can be difficult to produce using conventional machining methods, a simple stamping or cutting process as disclosed herein can be used to cut individual layers, with thermal or other joining treatment used to join the layers. Compared to many conventional machining methods, this approach may be faster and cheaper in many cases. Additionally, some complex internal features of parts may be impossible to form in any other way.

The disclosed process is not only a method of quick prototyping, but offers a method of rapid assembly whereby forms are stamp cut in one operation. Machine placement can then align the sheets, and the final join process can be highly automated. No finishing steps may be needed at all. Additional automation can allow for separate cutting or stamping of the brazing/soldering or other joining medium, cut to fit exactly in the assembly, and its placement in the stack. Adhesive material can be handled similarly.

Figure 12:
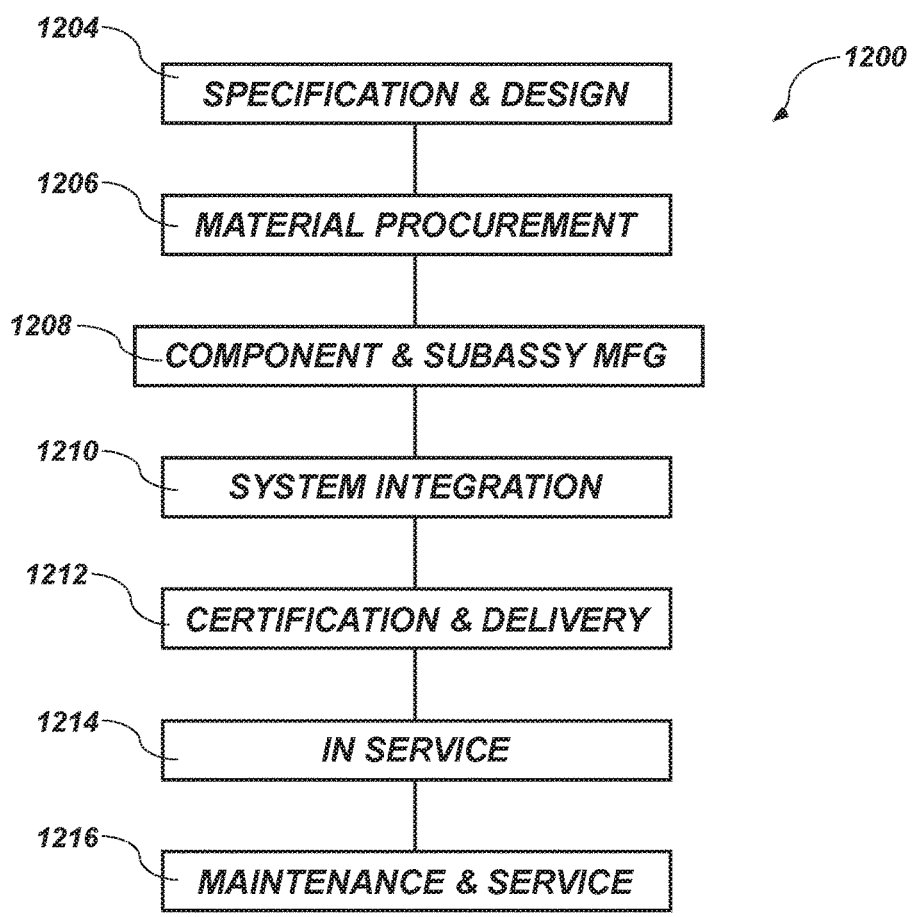
FIG. 12 is a flow diagram of an aircraft production and service methodology.
Figure 13:
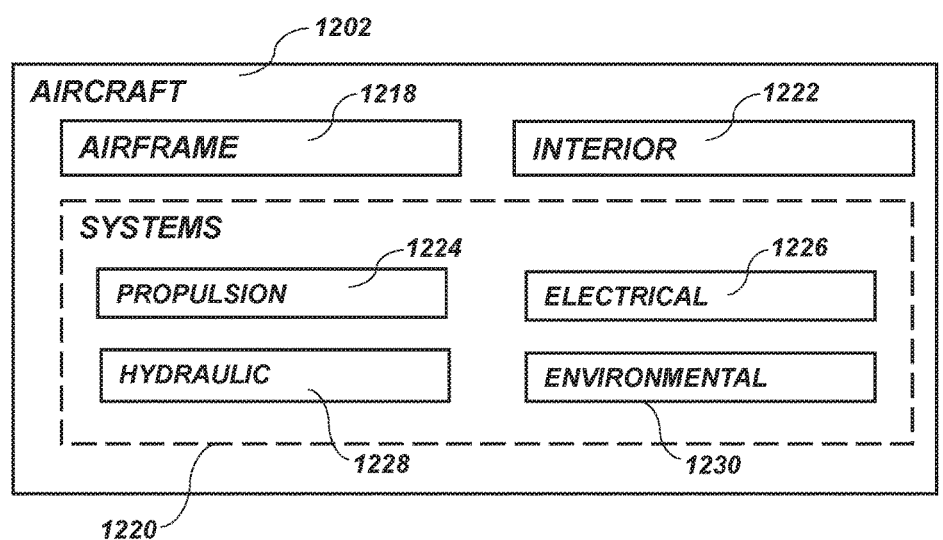
FIG. 13 is a block diagram of an aircraft.

Embodiments of the disclosure may be described in the context of an aircraft manufacturing and service method 1200 as shown in FIG. 12 and an aircraft 1202 as shown in FIG. 13. For example, a phase change medium container produced in accordance with this disclosure can be part of an energy harvesting device that is designed, fabricated and installed in an aircraft during various design and manufacturing phases. During pre-production, exemplary method 1200 may include specification and design 1204 of the aircraft 1202 and material procurement 1206. During production, component and subassembly manufacturing 1208 and system integration 1210 of the aircraft 1202 takes place. Thereafter, the aircraft 1202 may go through certification and delivery 1212 in order to be placed in service 1214. While in service by a customer, the aircraft 1202 is scheduled for routine maintenance and service 416 (which may also include modification, reconfiguration, refurbishment, and so on).

Each of the processes of method 1200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 13, the aircraft 1202 produced by exemplary method 1200 may include an airframe 1218 with a plurality of systems 1220 and an interior 1222. Examples of high-level systems 1220 include one or more of a propulsion system 1224, an electrical system 1226, a hydraulic system 1228, and an environmental system 1230. Any number of other systems may be included. Although an aerospace example is shown, the principles of the invention may be applied to other industries, such as the automotive industry.

Apparatus and methods embodied herein may be employed during any one or more of the stages of the production and service method 1200. For example, components or subassemblies corresponding to production process 1208 may be fabricated or manufactured in a manner similar to components or subassemblies produced while the aircraft 1202 is in service. Also, one or more apparatus embodiments, method embodiments, or a combination thereof may be utilized during the production stages 1208 and 1210, for example, by substantially expediting assembly of or reducing the cost of an aircraft 1202. Similarly, one or more of apparatus embodiments, method embodiments, or a combination thereof may be utilized while the aircraft 1202 is in service, for example and without limitation, to maintenance and service 1216.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. A system for fabricating a part, comprising:
a controller, comprising a processor and system memory, provided with software for generating a parametric model of a sectionalized three-dimensional part;
a first bulk source of sheet material;
a first forming device, associated with the controller and configured to produce layers of the sectionalized three-dimensional part from sheet material;
a first feeding device, configured to feed the sheet material from the first bulk source to the first forming device;
a second bulk source of bonding medium, the bonding medium comprising a first bonding agent and a second bonding agent;
a second forming device, associated with the controller and configured to produce bonding layers from the bonding medium;
a second feeding device, configured to feed the bonding medium from the second bulk source to the second forming device;
a robotic arm, configured to retrieve the layers of the sectionalized three-dimensional part from the first forming device, to retrieve the bonding layers from the second forming device, to stack and align the layers in a stacking order and to position at least one of the bonding layers between the layers in the stacking order, the first bonding agent temporarily joining the layers; and
a joining device, configured to permanently join the layers in a stack to produce the part by activating the second bonding agent in the bonding layers and at least partially removing the first bonding agent from the bonding layers.

2. The system of claim 1, wherein the forming device comprises a cutting device.

3. The system of claim 2, wherein the cutting device is selected from the group consisting of a laser cutting device, a water jet cutting device, and a stamping press.

4. The system of claim 1, wherein the forming device comprises a photochemical etching device.

5. The system of claim 4, wherein the photochemical etching device comprises:
an exposure device configured to expose an area of photoresist applied to the sheet material to electromagnetic radiation thereby hardening the area of photoresist; and a chemical bath configured to etch portions of the sheet material that fall outside the area of photoresist that is hardened.

6. The system of claim 1, wherein the forming device is further configured to form guide holes in the layers.

7. The system of claim 1, wherein the robotic arm is further configured to stabilize the layers by inserting guide pins through guide holes in the layers for aligning the layers.

8. The system of claim 1, wherein the joining device is configured to subject the layers to heat at a level that is below a melting temperature of the sheet material.

9. The system of claim 1, wherein the joining device is further configured to subject the layers to pressure.

10. The system of claim 1, wherein the joining device includes an oven, a kiln, a heating torch, a heating plate, or an induction heater.

11. The system of claim 1, wherein the joining device is further configured to remove or burn out guide pins for aligning the layers.

12. A system for fabricating a part, comprising:
a first intermediate storage location, configured to store templates of a bonding medium, the bonding medium comprising a first bonding agent and a second bonding agent;
a second intermediate storage location, configured to store layers of a sectionalized three-dimensional part, formed from sheet material;
a robotic tool, configured to stack and align the layers of the sectionalized three-dimensional part, formed from the sheet material, in a stacking order and to position the templates of the bonding medium between the layers, the first bonding agent temporarily joining the layers; and
a joining device, configured to permanently join the layers in a stack to produce the part by activating the second bonding agent.

13. The system of claim 12, further comprising:
a controller, comprising a processor and system memory, provided with software for generating a parametric model of the sectionalized three-dimensional part.

14. The system of claim 12, further comprising:
a forming device configured to produce the layers of the sectionalized three-dimensional part from the sheet material.

15. The system of claim 14, further comprising:
a feeding device, configured to feed the sheet material to the forming device.

16. The system of claim 14, wherein the forming device includes a cutting device or a photochemical etching device.

17. The system of claim 14, further comprising:
a second forming device configured to form the templates from the bonding medium.

18. The system of claim 12, wherein the joining device includes an oven, a kiln, a heating torch, a heating plate, or an induction heater.

19. The system of claim 1, further comprising:
a first intermediate storage location, configured to store templates of a bonding medium, the bonding medium comprising the first bonding agent and the second bonding agent; and
a second intermediate storage location, configured to store the layers, wherein the robotic arm is configured to retrieve the templates of the bonding medium from the first intermediate storage location and retrieve the layers from the second intermediate storage location.

20. A system for fabricating a part, the system comprising:
a controller, comprising a processor and system memory, provided with software for generating a parametric model of a sectionalized three-dimensional part;
a first bulk source of sheet material;
a first forming device, associated with the controller and configured to produce layers of the sectionalized three-dimensional part from the sheet material;
a first feeding device, configured to feed the sheet material from the first bulk source to the first forming device;
a first intermediate storage location, configured to receive the layers of the sectionalized three-dimensional part, produced by the first forming device;
a second bulk source of bonding medium, the bonding medium comprising a first bonding agent and a second bonding agent;
a second forming device, associated with the controller and configured to produce bonding layers from the bonding medium;
a second feeding device, configured to feed the bonding medium from the second bulk source to the second forming device;
a second intermediate storage location, configured to receive the bonding layers, produced by the second forming device;
a robotic arm, configured to retrieve the layers of the sectionalized three-dimensional part from the first intermediate storage location, to retrieve the bonding layers from the second intermediate storage location, to stack and align the layers in a stacking order, and to position at least one of the bonding layers between adjacent ones of the layers in the stacking order, the first bonding agent temporarily joining the layers; and
a joining device, configured to permanently join the layers in a stack to produce the part by activating the second bonding agent in the bonding layers and at least partially removing the first bonding agent from the bonding layers.

* * * * *